US012097522B2

(12) United States Patent
Onofrio

(10) Patent No.: US 12,097,522 B2
(45) Date of Patent: Sep. 24, 2024

(54) ARC ARREST MECHANISM FOR IRRIGATION SPRINKLERS

(71) Applicant: The Toro Company, Bloomington, MN (US)

(72) Inventor: Travis L. Onofrio, Bloomington, MN (US)

(73) Assignee: The Toro Company, Bloomington, MN (US)

(*) Notice: Subject to any disclaimer, the term of this patent is extended or adjusted under 35 U.S.C. 154(b) by 347 days.

(21) Appl. No.: 17/242,005

(22) Filed: Apr. 27, 2021

(65) Prior Publication Data

US 2022/0339645 A1 Oct. 27, 2022

(51) Int. Cl.
*B05B 3/04* (2006.01)
*B05B 3/00* (2006.01)
*B05B 15/74* (2018.01)

(52) U.S. Cl.
CPC ............ *B05B 3/0431* (2013.01); *B05B 3/003* (2013.01); *B05B 15/74* (2018.02)

(58) Field of Classification Search
CPC ........ B05B 3/0431; B05B 15/74; B05B 3/003
USPC .......................................... 239/252, 203–206
See application file for complete search history.

(56) References Cited

U.S. PATENT DOCUMENTS 3,724,757 A * 4/1973 Hunter .................. B05B 3/0431 239/205
4,986,474 A * 1/1991 Schisler .................. B05B 3/005 239/206

* cited by examiner

*Primary Examiner* — Christopher S Kim
(74) *Attorney, Agent, or Firm* — Inskeep IP Group, Inc.

(57) ABSTRACT

A mechanism is described to resist or prevent rotation of portions of an irrigation sprinkler riser when in its lowered or popped-down position. Hence, when a pedestrian walks over a lowered sprinkler or a lawn mower rolls over a sprinkler, for example, the riser will remain fixed in its rotational orientation relative to its outer body and surroundings. By resisting or preventing this rotation, this rotational locking mechanism prevents damage to the internal transmission, gears, and arc trip mechanisms of the sprinkler, as well as prevents the watering arc from being accidentally adjusted.

13 Claims, 8 Drawing Sheets

ARC ARREST MECHANISM FOR IRRIGATION SPRINKLERS

BACKGROUND OF THE INVENTION

Most rotating, pop-up irrigation sprinklers include a mechanism for determining which angles it rotates within during irrigation, known as a sprinkler's "watering arc." For example, a sprinkler may be located adjacent to a sidewalk and therefore it may be desirable to prevent the sprinkler's nozzle from rotating towards the sidewalk and instead be limited to rotating only towards areas of grass.

One concern with watering arc mechanisms is that a vandal will forcefully rotate a sprinkler's riser while it is irrigating. For example, a child may rotate the sprinkler's riser to spray their friends.

In some sprinkler models, this forced rotation will either change the size/position of the watering arc or may further damage the internal transmission mechanisms responsible for the rotation and watering arc settings. For example, forced rotation may result in broken drive gears or broken trip tabs in the trip mechanism causing a permanent stall, increase or decrease of the watering arc angle, or rotation of the watering arc to a different location.

Other sprinkler models include a "memory arc" feature that allows a sprinkler's riser to be hand-rotated without changing the adjustment of its watering arc settings and without otherwise causing damage to the sprinkler's transmission. Examples of such mechanisms can be found in U.S. Pat. Nos. 5,383,600; 10,464,083; and U.S. Pub. No. 2019/0283051; all of which are hereby incorporated by reference herein. These mechanisms typically release their connection from various transmission components to prevent damage or adjustment changes.

Commercial sprinklers often include memory arc mechanisms since they are intended for public locations, such as parks and sports fields, that are most prone to such unintended, manual sprinkler rotation. However, these commercial sprinklers are often more expensive and sometimes less durable than sprinklers without such a feature due to the complexity of their transmissions.

Residential sprinkler models, on the other hand, typically do not have vandal resistant memory arc mechanisms since consumers are typically less inclined to pay the additional cost of this feature that comes with the more complex sprinkler transmission. Additionally, it is thought to be less likely that a non-resident/vandal will attempt to forcefully rotate the sprinkler during operation at a residential location.

In this respect, the belief in the irrigation industry has been that this sprinkler "vandalism" occurs only when sprinkler risers are popped up and rotating during irrigation. When irrigation has stopped and the sprinkler risers have popped down, there would otherwise be little incentive to forcefully rotate the sprinkler riser (e.g., there would be no water spraying from the sprinkler for the vandal to "spray around").

However, the inventors have conducted extensive research, testing, and field return analysis, on this issue and have found that most field problems with conventional, non-memory arc rotors, are caused by rotation of the sprinkler riser in the unpressurised, popped-down condition. The inadvertent popped-down rotation of the nozzle base can have numerous causes. For example, a rotating wheel of a lawn mower or shoe contact from a pedestrian may inadvertently cause the lowered sprinkler riser to rotate. Hence, despite the lack of intentional vandalism, other causes of damage or watering arc changes are present, particularly with a residential sprinkler without a memory arc mechanism.

In this respect, while commercial rotating sprinklers with a memory arc feature are typically protected against forced rotation when popped up and popped down, the inventors have discovered that residential rotors without the feature are not and tend to be the subject of damage from inadvertent popped-down rotation. The inventors believe that, until now, inadvertent popped-down rotation has not been recognized as the root cause for a majority of damage to sprinklers without a memory arc feature and therefore there is an unmet need to address this damage without the added cost of a complex memory arc mechanism.

SUMMARY OF THE INVENTION

The present invention is generally directed to a mechanism configured to resist or prevent rotation of portions of an irrigation sprinkler riser when in its lowered or popped-down position. Hence, when a pedestrian walks over a lowered sprinkler or a lawn mower rolls over a sprinkler, for example, the riser will remain fixed in its rotational orientation relative to its outer body and surroundings. By resisting or preventing this rotation, this rotational locking mechanism prevents damage to the internal transmission, gears, and arc trip mechanisms of the sprinkler, as well as prevents the watering arc from being accidentally adjusted.

In one embodiment, the present invention is directed to an interface between two sprinkler surface that normally rotate relative to each other. The surfaces are spaced apart from each other such that they have little or no contact with each other, thereby allowing portions of the sprinkler to rotate as part of normal operation. However, one or more of the surfaces also include friction generating features, such as material that tends to "grab" opposing surfaces of the interface or elevated bumps, ridges, or similar raised elements. Hence, as downward force is applied to the sprinkler (e.g., a person or vehicle on top of the sprinkler), the friction generating features of the interface allow the two surfaces to engage each other and prevent the sprinkler riser or turret from rotating, thereby preventing damage or improper adjustment to components of the sprinkler.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
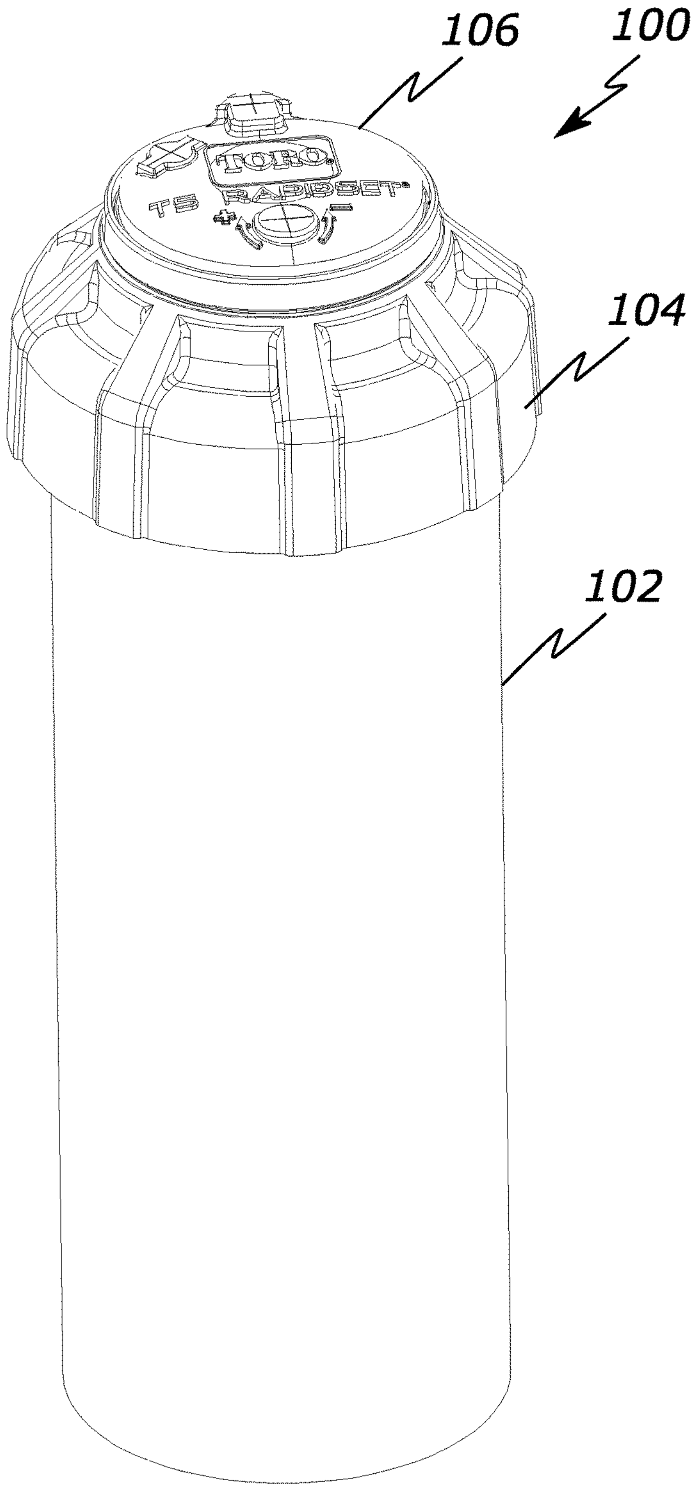
FIG. 1 is a perspective view of a sprinkler in a lowered position.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. While different embodiments are described, features of each embodiment can be used interchangeably with other described embodiments. In other words, any of the features of each of the embodiments can be mixed and matched with each other, and embodiments should not necessarily be rigidly interpreted to only include the features shown or described.

The present invention is generally directed to a mechanism configured to resist or prevent rotation of portions of an irrigation sprinkler riser when in its lowered or popped-down position. Hence, when a pedestrian walks over a lowered sprinkler or a lawn mower rolls over a sprinkler, for example, the riser will remain fixed in its rotational orientation relative to its outer body and surroundings. By resisting or preventing this rotation, this rotational locking mechanism prevents damage to the internal transmission, gears, and arc trip mechanisms of the sprinkler, as well as prevents the watering arc from being accidentally adjusted.

Figure 2:
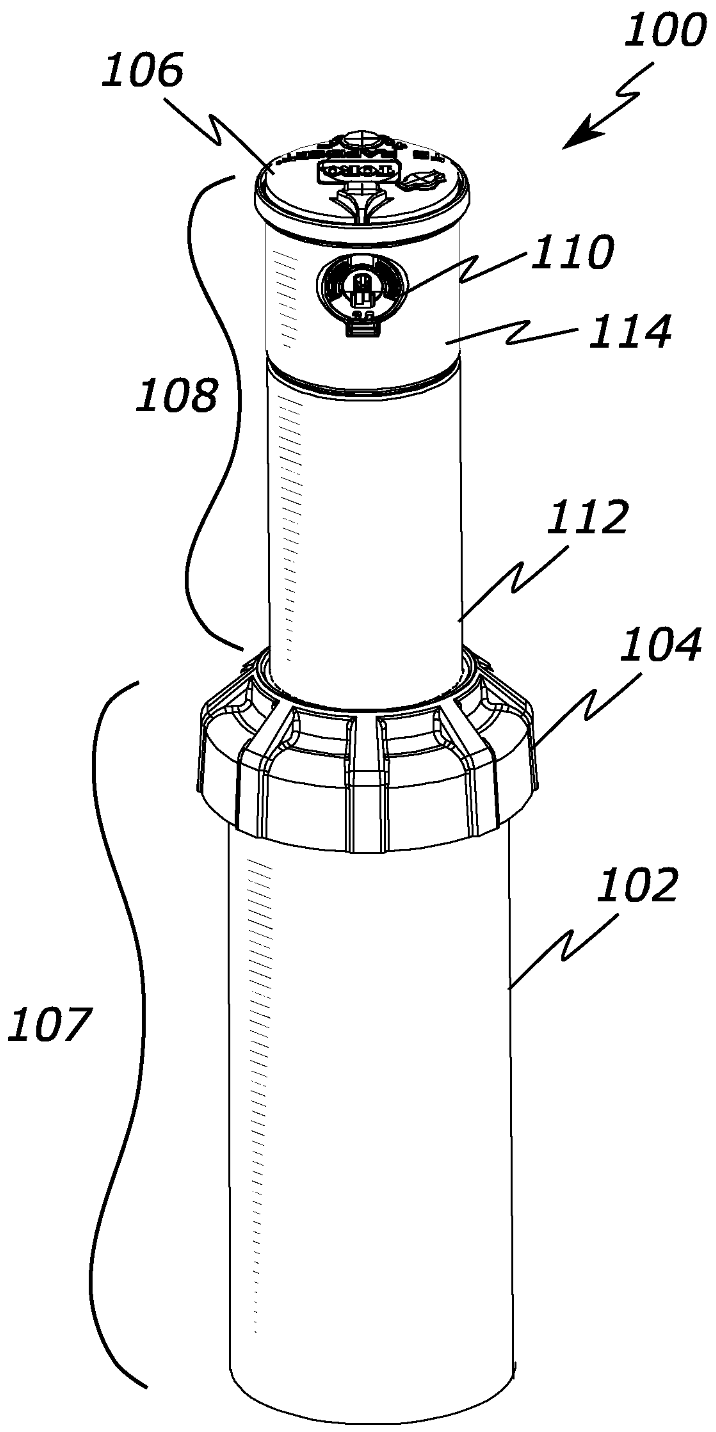
FIG. 2 is a perspective view of a sprinkler in a raised position.

FIG. 1 illustrates an example sprinkler 100 in a lowered or popped-down position when not irrigating, while FIG. 2 illustrates the sprinkler 100 in a raised or popped-up position during irrigation. The sprinkler 100 includes a sprinkler base assembly 107 that typically includes a lower sprinkler body 102 that is connected to a water source and a riser 108 that is mounted within and configured to move vertically within the body 102. As water enters the sprinkler body 102, it further travels into the riser 108, causing the riser 108 to raise out of the body 102 and eject water from the sprinkler nozzle 110.

Figure 3:
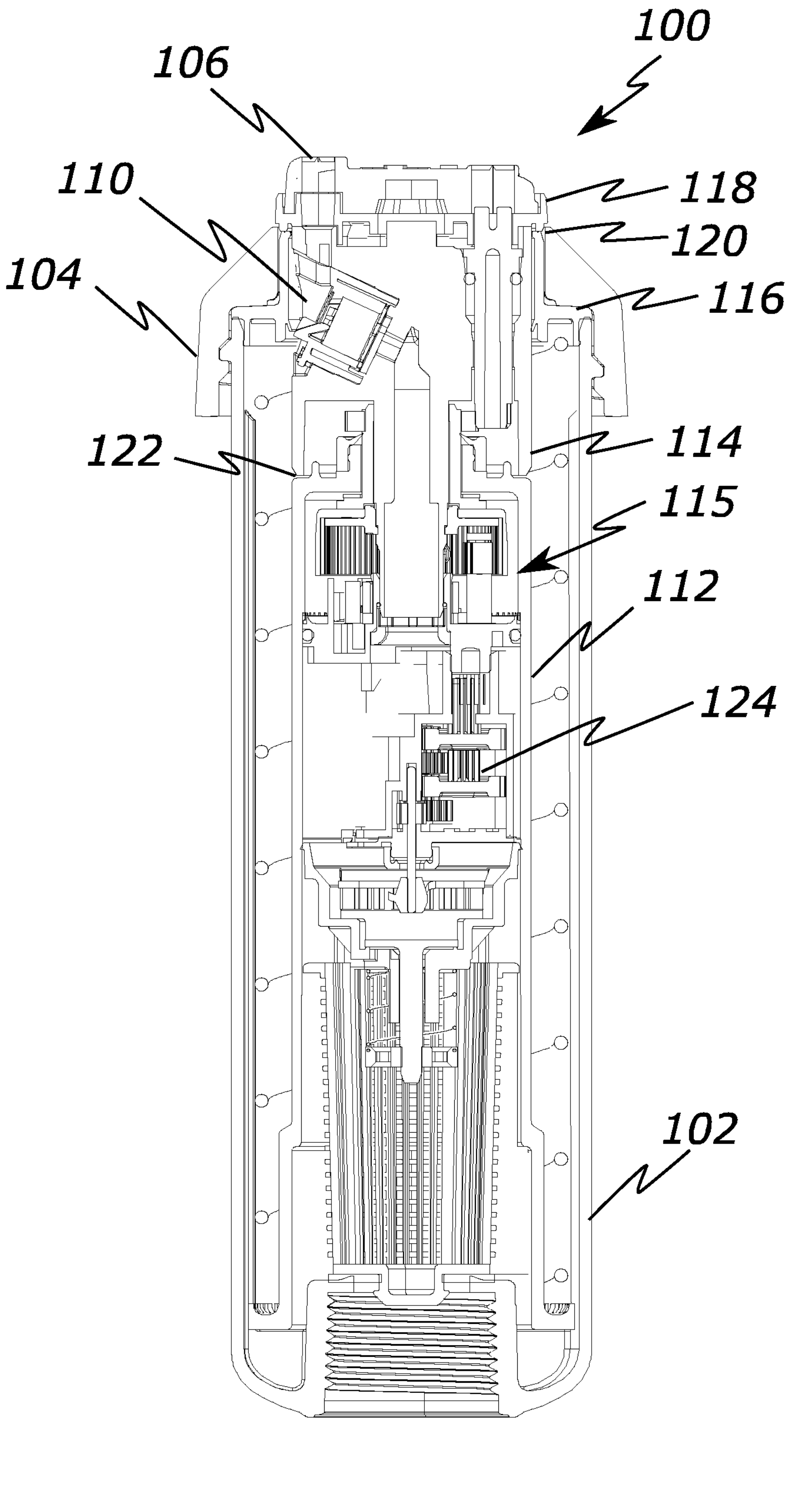
FIG. 3 is a cross sectional view of a sprinkler.

As best seen in FIG. 3, the riser 108 includes a sprinkler transmission 124 that that causes a turret 114 mounted on a lower riser portion 112 to rotate during irrigation, thereby also rotating the nozzle 110. The transmission 124 also typically includes a mechanism for setting or determining a watering arc within which the nozzle 110 is rotated, thereby allowing a user to determine which areas around the sprinkler should be watered. Typically, watering arc mechanisms include a "trip mechanism" (e.g., trip mechanism 115) that will "trip" at positions set by the user to cause the direction of rotation to reverse, thereby maintaining the nozzle 110 within a specific arc during irrigation.

As previously discussed, the inventors have discovered that a significant portion of damage and accidental arc adjustments are the result of rotating the riser 108 (more specifically the turret 114) when the sprinkler 100 is in its lowered, popped-down position (FIG. 1). For example, as a pedestrian or lawnmower wheel moves over the top cap 106 of the sprinkler 100, the turret 114 can be forced to rotate relative to the riser base 112. This movement of the turret 14 can cause portions of the watering arc to change. For example, the direction of the watering arc might be changed or the position of one of the "trip stops" may be changed to cause the watering arc to increase in size. If the force is relatively high, portions of the transmission 124 or trip mechanism 115 may be damaged, which may prevent the nozzle rotation from being limited to the watering arc or may prevent any rotation of the turret 110 entirely.

The present invention is directed to a brake mechanism that engages only when the riser 108 is in its popped down position, and/or when further downward force is applied. Put another way, the riser 108 is prevented from rotating at least when downward force is placed on the top sprinkler cap 106 but may also be prevented without such additional force when in the popped-down position. For example, the mechanism may only lock rotation when a pedestrian or vehicle moves over the sprinkler 100 or may lock rotation as soon as the riser 108 moves to its lowered position.

In one embodiment, the rotation locking mechanism is directed to raised or elevated features that extend from one sprinkler surface and engage a second sprinkler surface when the riser 108 is in its lowered position and/or when downward force is applied to the sprinkler cap 106.

Figure 4:
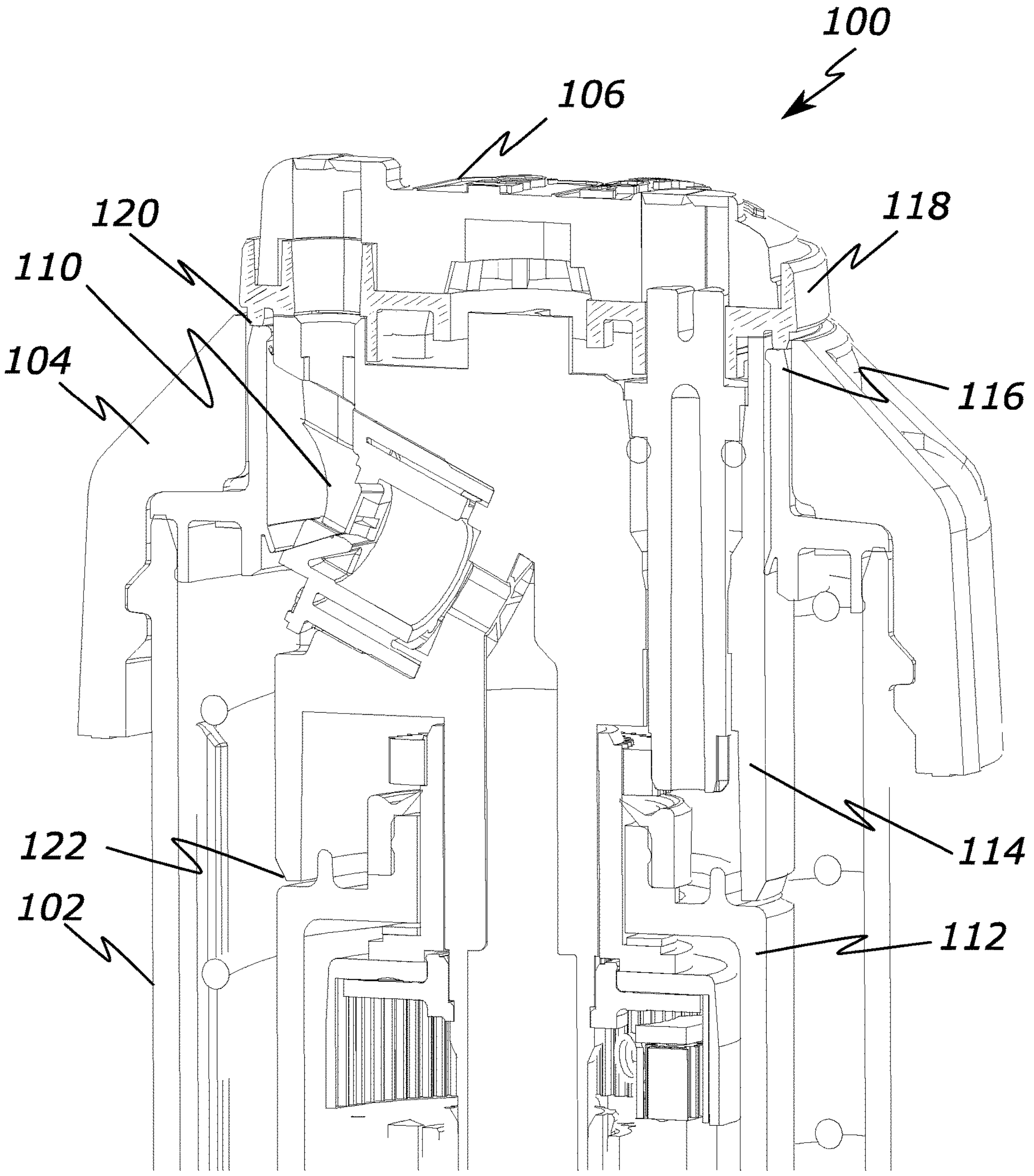
FIG. 4 is a cross sectional view of a sprinkler.

In one example seen in FIG. 4, the mechanism can be created at an interface 120 between a lower turret cover 118 and a riser seal 116. In other words, between a lower surface of the lower turret cover 118 and an upper surface of the riser seal 116.

The riser seal 116 is typically positioned near a top of the lower sprinkler body 102 and has a circular shape configured to engage against or contact the outer surface of the riser 108 (the turret 114 and the lower riser portion 112). In this respect, the riser seal 116 helps seal the gap between the lower sprinkler body 102 and the riser 108 to keep dirt, debris, and other elements out, while also keeping pressurized water within the sprinkler 100. The riser seal 116 may be composed of a flexible material (e.g., 80 Shore durometer), such as rubber, silicone, thermoplastic elastomer, or similar polymer materials. Typically, a base cap 104 is screwed to a top of the sprinkler body 102 to help maintain the position of the riser seal 116.

Figure 7:
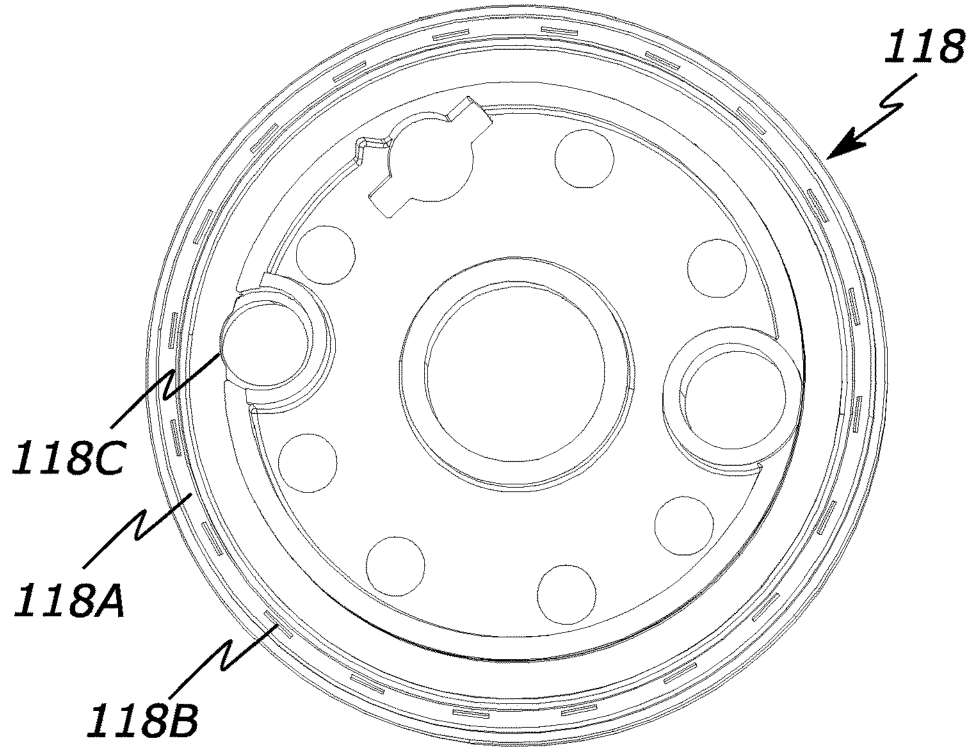
FIG. 7 is a bottom view of a sprinkler cover.
Figure 8:
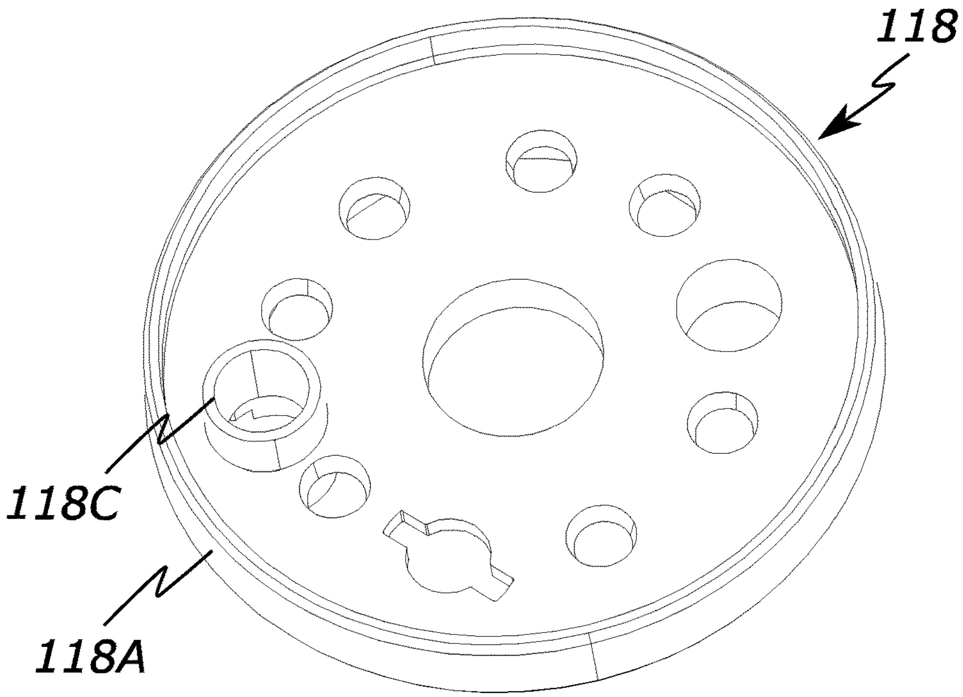
FIG. 8 is a top perspective view of a sprinkler cover.
Figure 9:
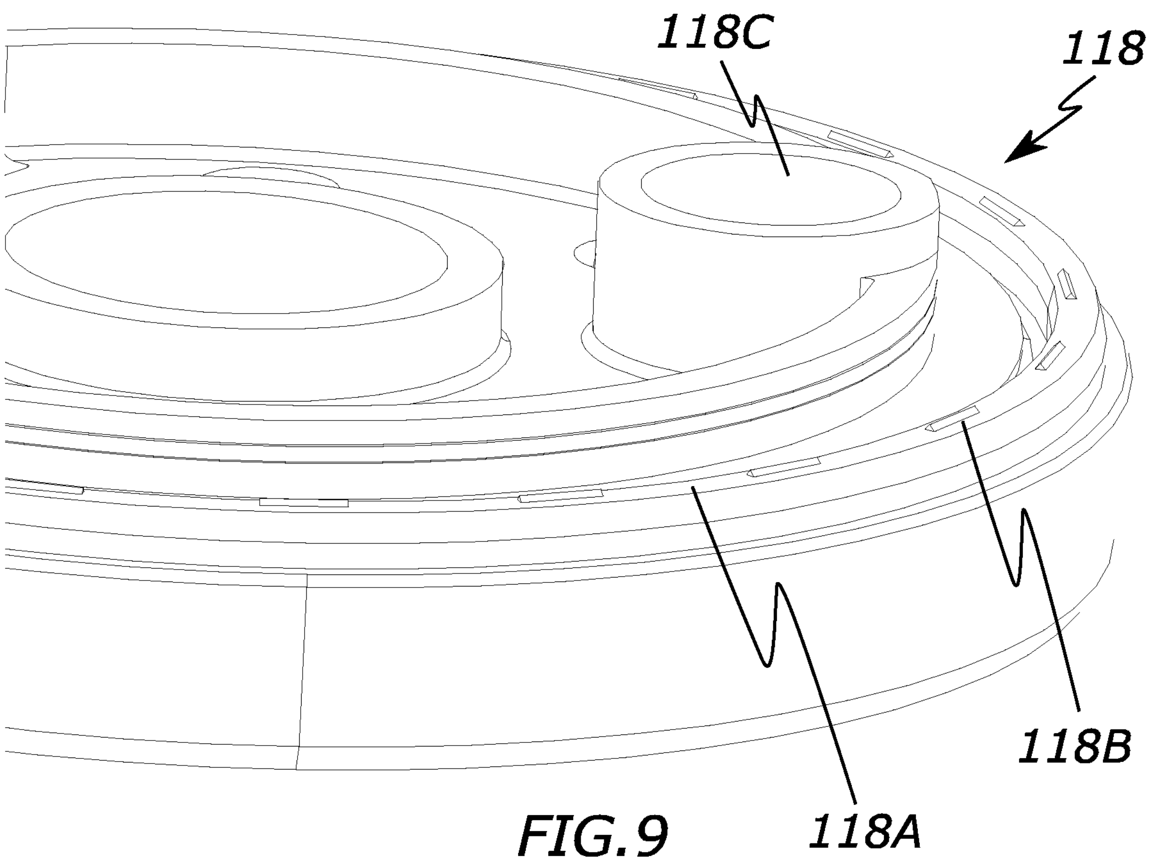
FIG. 9 is a magnified view of the friction-generating surface on a sprinkler cover.

The lower turret cover 118, which can also be seen in FIGS. 7-9, is positioned over a top of the turret 114 and may connect to a bottom of the top cap 106 to form a top surface of the sprinkler 100. The lower turret cover 118 may include a plurality of apertures 118C to allow passage therethrough of adjustment elements to adjust various aspects of the sprinkler 100, such as the watering arc, water breakup screw, or water throw distance. The lower turret cover 118 may typically be composed of a resilient material.

Figure 5:
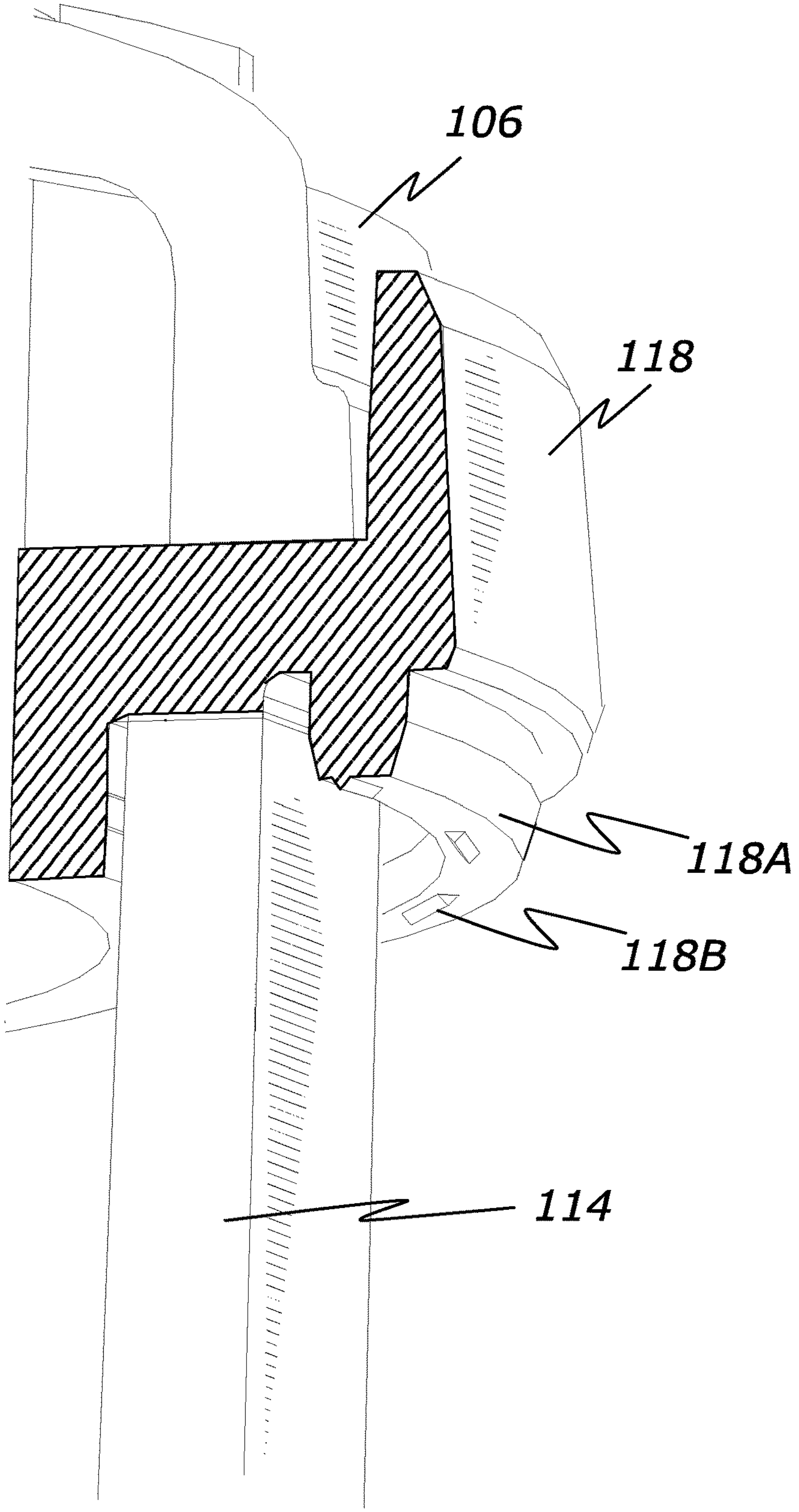
FIG. 5 is a cross sectional view of a sprinkler illustrating a friction-generating surface.
Figure 6:
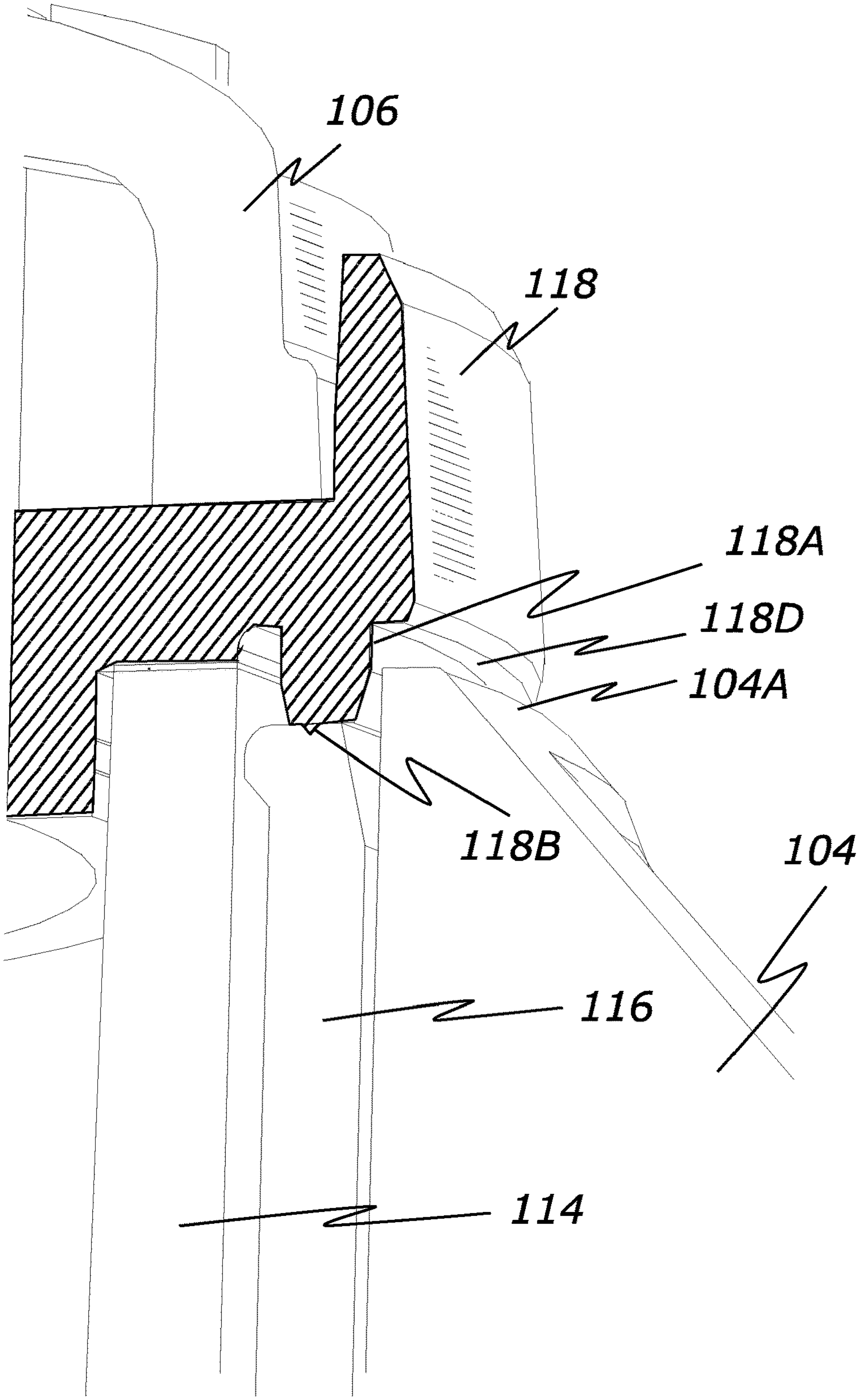
FIG. 6 is a cross sectional view of a sprinkle illustrating a friction-generating surface.

FIGS. 5 and 6 illustrate magnified cross-sectional views of the turret cover 118, which includes a ridge 118A oriented downwards relative to a top of the sprinkler 100. The ridge 118A can extend entirely around the circumference of the sprinkler 100 and can include a lower-facing surface with a plurality of raised elements 118B extending from the lower-facing surface.

When the riser 108 is in its raised, popped-up position, the ridge 118A and raised elements 118B are free from direct contact with any other components. When the riser 108 is in its lowered, popped-down position, the raised elements 118B (and possibly the lower surface of the ridge 118A) contact and engage the top surface of the riser seal 116. As rotational force is applied to the riser 108 (e.g., by a foot or wheel), the raised elements 118B help resist this rotational force. The raised elements 118B may particularly resist rotation when they are somewhat resilient and the riser seal 108 is at least somewhat flexible, allowing the raised elements 118B to push into the surface of the riser seal 116. Downward force on the sprinkler 100 may further engage the raised elements 118B with the riser seal 116.

Alternately, the raised elements 118B may be located on the top surface of the riser seal 116 so that they engage the bottom surface of the ridge 118A. While the lower turret cover 118 is likely to be composed of a rigid material, at least portions of the lower ridge 118A may be composed of flexible material or layer to help with engagement of the raised elements 118B (e.g., a washer).

Figure 10:
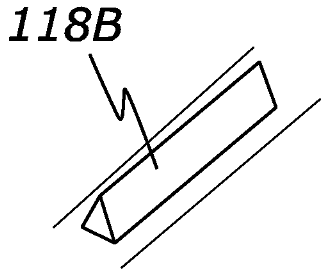
FIG. 10 is a magnified view of an elevated, friction-generating element.
Figure 11:
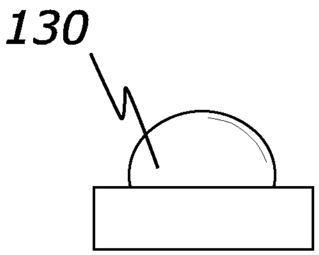
FIG. 11 is a magnified view of an elevated, friction-generating element.
Figure 12:
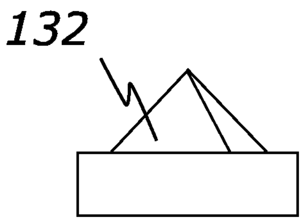
FIG. 12 is a magnified view of an elevated, friction-generating element.
Figure 13:
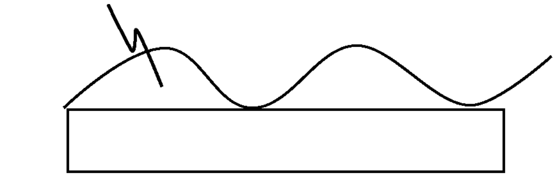
FIG. 13 is a magnified view of an elevated, friction-generating element.

The raised elements 118B can have a variety of different shapes. Generally, a relatively low height allows the elements 118B to bite into the riser seal 116 without causing damage. For example, FIG. 10 illustrates an elongated, two-sided shape forming a triangular cross section. In one example, this triangular shape may have a height within an inclusive range of about 0.005 to 0.020 inches, a length of about 0.080 inches and be spaced apart from each other by about 0.160 inches. FIG. 11 illustrates another example of a raised element 130 having a spherical shape. FIG. 12 illustrates another example of a raised element 132 having 3 or more sides and forming a pyramid-like shape. FIG. 13 illustrates another example of a raised element 134 forming a plurality of undulating waves. In one embodiment, the surface opposite the raised elements (e.g., the top surface of the riser seal 116) may include depressions of a similar mating shape to the raised elements to help create engagement. In one example, any of the raised elements can have a height within an inclusive range of about 0.005 to 0.020 inches. The intent with such sizes is that the riser seal 116 not be forcibly engaged with the raised elements 118B by the main retract spring of the sprinkler 100. This may prevent loading the riser seal 116 continuously when popped down. The elastomer of the riser seal 116 could take a set in a lower relative position which would reduce friction/bite when needed to function.

The interface 120 between the riser seal 116 and the turret cover 118 is merely an example. Such an interface can be created between any two components of the riser 108 and the lower base assembly 107. Almost any two components can be used so long as they can come into contact with each other when the sprinkler is in the lowered position. In one specific example, an outer, lower surface 118D of the lower turret cover 118 can be configured to contact an upper surface 104A of the base cap 104, as seen in FIG. 6. Either of the lower surfaces 118D may include raised elements as previously described.

It may further be possible to create a similar locking mechanism between two components of the riser 108. For example, FIG. 4 illustrates an interface 122 created between a lower surface of the turret 114 and with the upper surface of the lower riser portion 112. In this example, either surface can include any of the raised elements previously described. While these two surfaces of the turret 114 and the lower riser portion 112 must normally rotate relative to each other, they can be configured to have a very small gap between them during normal operation. However, when a moderate amount of force presses downward on the turret 114 (e.g., at least 5 lbs.), the gap closes and allows the raised elements to engage the opposing surface. In one example, the two surfaces form a gap within an inclusive range of about 0.020 inch to 0.040 inch.

Similar friction-generating interfaces between a lower surface of the turret 114 and with an upper surface of the lower riser portion 112 can occur in locations within the riser 108, such as with different structural components and even with portions of the transmission. Additionally, a sprinkler can include friction-generating interfaces at two or three different interfaces to achieve a better rotational stop or braking system.

In one example, the lower turret cover 118 (or other component with raised elements) can be provided as a kit, allowing a user to upgrade an existing sprinkler 100. Hence, one aspect of the invention is directed to a method of upgrading an existing sprinkler 100 by replacing an existing sprinkler component with a new component that includes raised elements, as discussed in this specification.

In one embodiment, an O-ring can be used at any of the previously described interfaces. This O-ring can be used in addition to the previously described features (e.g., the ridge 118A and raised elements 118B) or can be used in place of such elements (e.g., in place of the ridge 118A). In that respect, the O-ring may be composed of a flexible material that creates friction between contacting components (e.g., silicone, rubber, or polymer) and can include a plurality of raised elements 118A or other textured features to further enhance friction. Such an O-ring may be included with a sprinkler or can be provided as an upgrade kit.

In another embodiment, the outer surface of the riser 108 and the inner surface of the sprinkler base assembly 107 may include mating features that engage with each other when the riser 108 moves to its lowered position. For example, either of these surfaces may include vertical channels that mate with vertical ridges, preventing rotational movement until the riser 108 is raised.

In another embodiment, the sprinkler 100 may include an alternate mechanism for preventing rotation via a switch that selectively locks rotation of the sprinkler 100 when stepped on or rolled on by a wheel. For example, the cap 106 or a switch mechanism under the cap 106 may be configured to have both a raised position and a depressed position. A spring or other element can bias the cap 106 to its raised position. The cap 106 can be connected to a locking member that, when moved downward, engages a non-rotational component of the sprinkler 100 (e.g., a component of the lower riser portion 112 or the lower sprinkler base 107). Hence, the rotational lock only engages when the cap 106 is affirmatively depressed downward.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A sprinkler comprising:

a sprinkler base assembly connectable to a water source;

a riser that increases in a height from the sprinkler base assembly during irrigation; the riser comprising a turret that rotates a nozzle; and, a rotational brake mechanism comprising a plurality of rigid raised elements and a flexible material; wherein the plurality of rigid raised elements and the flexible material are positioned at locations between a lower surface of the turret and an upper surface of the sprinkler base assembly; wherein each rigid raised element of the plurality of rigid raised elements is spaced circumferentially apart from two other rigid raised elements of the plurality of rigid raised elements about the lower surface of the turret, wherein each rigid raised element of the plurality of rigid raised elements has the same radial dimension; and wherein the plurality of rigid raised elements engage the flexible material when a downward force is applied to a top of the riser when the riser is in a lowered position.

2. The sprinkler of claim 1, wherein the locations between the lower surface of the turret and the upper surface of the sprinkler base assembly are positioned circumferentially around the sprinkler.

3. The sprinkler of claim 2, wherein the locations between the lower surface of the turret and the upper surface of the sprinkler base assembly are aligned with each other.

4. The sprinkler of claim 1, wherein the plurality of rigid raised elements extend from the lower surface of the turret.

5. The sprinkler of claim 4, wherein the lower surface of the turret is located on a turret cover of the riser and the flexible material is a sprinkler riser seal of the sprinkler base assembly.

6. The sprinkler of claim 1, wherein the plurality of rigid raised elements have a height within an inclusive range of about 0.005 to 0.020 inches.

7. The sprinkler of claim 1, wherein the plurality of rigid raised elements have a triangular shape, a spherical shape, a pyramid shape, or an undulating wave shape.

8. A sprinkler comprising:

a sprinkler base assembly connectable to a water source;

a riser having a raised position during an irrigation event and a lowered position relative to the sprinkler base assembly; the riser comprising a turret that rotates a nozzle; and, a rotational brake mechanism comprising a plurality of rigid raised elements and a flexible material; wherein the plurality of rigid raised elements and the flexible material are positioned at locations between a lower surface of the turret and an upper surface of a lower riser portion of the riser; wherein each rigid raised element of the plurality of rigid raised elements is spaced circumferentially apart from two other rigid raised elements of the plurality of rigid raised elements about the lower surface of the turret, wherein each rigid raised element of the plurality of rigid raised elements has the same radial dimension; and wherein the plurality of rigid raised elements engage the flexible material when a downward force is applied to a top of the riser.

9. The sprinkler of claim 8, wherein the plurality of rigid raised elements are circumferentially positioned circumferentially around the sprinkler.

10. The sprinkler of claim 8, wherein the plurality of rigid raised elements extend from the lower surface of the turret.

11. The sprinkler of claim 8, wherein the plurality of rigid raised elements and the flexible material are spaced apart from each other 0.020 inch to 0.040 inch, and wherein the downward force applied to the top of the riser engages the plurality of rigid raised elements and the flexible material.

12. The sprinkler of claim 11, wherein the plurality of rigid raised elements have a height within an inclusive range of about 0.005 to 0.020 inches.

13. The sprinkler of claim 8, wherein the plurality of rigid raised elements have a triangular shape, spherical shape, pyramid shape, or undulating wave shape.

* * * * *